Oct. 21, 1941.  A. B. SIMON, JR  2,260,266
CONTROL SYSTEM
Filed Oct. 28, 1937
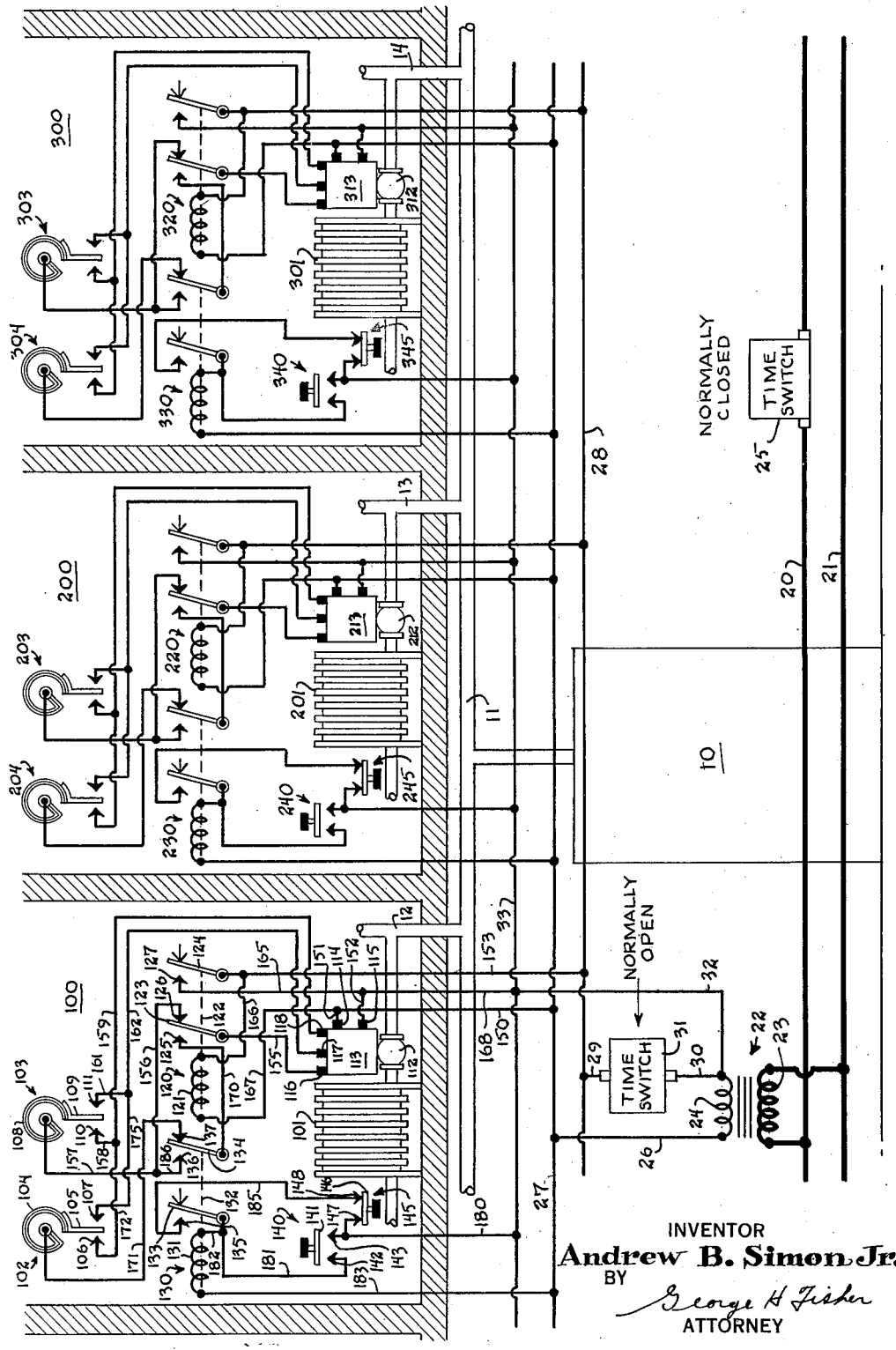
INVENTOR
Andrew B. Simon, Jr.
BY
George H Fisher
ATTORNEY Patented Oct. 21, 1941

2,260,266

UNITED STATES PATENT OFFICE 2,260,266

CONTROL SYSTEM

Andrew B. Simon, Jr., Cleveland, Ohio, assignor to Minneapolis-Honeywell Regulator Company, Minneapolis, Minn., a corporation of Delaware Application October 28, 1937, Serial No. 171,543

9 Claims. (Cl. 236—46)

This invention relates to a condition controlling system and more particularly to a temperature controlling system of the type wherein different predetermined temperatures are maintained in a space or spaces during different predetermined portions of a day.

In large buildings, such as schools, it is desirable to maintain the temperatures of the different rooms at one temperature during the day, or during the time that the building is being used, and to maintain a lower temperature during that portion of the day that the building is unoccupied. In order to effectively control the temperatures of the various rooms, it is usual to provide a separate controlling device for each room, and to provide a master controller for automatically causing the controlling devices to maintain a different temperature during that portion of the day that the building is unoccupied than during the portion of the day that the building is occupied.

It often happens that during the portion of the day that a lower temperature is being maintained in the building, or during the night shut-down period, one or more of the rooms may be occupied, in which case a higher temperature should be maintained in these rooms during the occupied period. Means are accordingly provided in each of the rooms for individually changing the controlling devices from night operation to day operation, and it is to this feature that my invention is more particularly directed.

These individual means for changing the controlling devices from night operation to day operation are so arranged that should they be operated during the day-time, as is very likely to happen when they are located in school rooms and accessible to children, they will have no effect on the system whatever. Means are also provided so that if they are operated during the night to maintain a higher temperature in one of the rooms, that at a certain predetermined time during the night, the controlling devices will again be placed on night operation, should the occupants neglect to manually place them back on night operation upon leaving the rooms.

In order to effect these results, each room is provided with a day thermostat and a night thermostat, and in a remote place, as in the basement, master controlling means are provided for placing the night thermostats in control of the heating means for each room after the building is normally unoccupied, and for placing the day thermostats in control shortly before the building is to be occupied in the morning. In each room are a pair of switches, one switch being adapted to place the day thermostat in control in the particular room during the night, and the other switch being adapted to place the night thermostat back into control during the night. The various controlling circuits are so arranged that during the day, operation of the switches will not affect the normal operation of the system.

It is accordingly an object of my invention to provide an improved condition controlling system wherein one condition is automatically maintained in a space during one portion of a day, in which a second condition is automatically maintained during the rest of the day, and in which the condition normally maintained during one portion of the day may be maintained when desired during another portion of the day.

More specifically, it is an object of my invention to provide a zone temperature control system wherein a high temperature is maintained in all the zones during the day, in which a lower temperature is maintained during the night, in which each zone is provided with manual control means whereby the day temperature may be maintained during the night in any particular zone, and in which operation of the manual control means during the day will not affect the temperature of any of the zones or the normal operation of the system.

It is a further object of my invention to provide improved means for effecting the desired results.

Other objects will appear upon a consideration of the accompanying specification, claims, and drawing.

In the drawing my invention is illustrated in schematic form. While a heating system of the direct radiation type is illustrated it should be understood that any other suitable type of heating system may be employed. A conventional furnace 10 of the hot water or steam type is provided and is connected with suitable radiators 101, 201, and 301 located in rooms or zones 100, 200, and 300 by a suitable pipe 11 and branch pipes 12, 13, and 14.

For supplying power to various electrical devices to be hereinafter described are lines 20 and 21 connected to a suitable source of power (not shown). Connected to the lines 20 and 21 is a step-down transformer 22 which includes a line voltage primary 23 and a low voltage secondary 24. In series with the line 20 is a time switch 25 of conventional construction, this time switch being normally closed and being adapted to open the circuit through line 20 at certain predetermined times during the day for a purpose to be later described. While the times during which the switch momentarily opens may be varied to suit the requirements of the system they may be taken as 7 a. m., 3:55 p. m., and 11 p. m.

Connected to one side of the secondary 24 by means of a conductor 26 is a line 27. A second line 28 is connected to the other side of the secondary 24 by means of conductors 29 and 30 and a time switch 31, this time switch being normally open and being adapted to be momentarily closed at certain times during the day. It will therefore be seen that line 28 is connected to secondary 24 only at such times as the time switch 31 is momentarily closed. For purposes of description it will be assumed that switch 31 closes momentarily at 4 p. m. and 11:05 p. m. Since the structure of time switches 25 and 31 forms no part of the present invention the details of these switches have not been shown. Also connected to the secondary 24 by means of a conductor 32 is a line 33.

Mounted in the space 100 are thermostats 102 and 103. Thermostat 102 includes a bimetallic element 104, a contact arm 105 carried thereby and fixed contacts 106 and 107. Thermostat 103 includes a bimetallic element 108, a contact arm 109 carried thereby and fixed contacts 110 and 111. Thermostat 102 is termed a night thermostat and thermostat 103 a day thermostat. The arms 105 and 109 are caused to move in response to temperature changes affecting the bimetallic elements 104 and 108, respectively. Arm 105 engages contact 106 when the temperature of the space 100 drops to a predetermined low value and engages the contact 107 when the temperature of the space rises to a predetermined high value. Similarly arm 109 engages contacts 110 and 111, respectively, in response to the attainment of low and high predetermined temperatures in the space. The arm 105 engages its contacts at lower temperatures than that at which the arm 109 engages its contacts. Thermostats 203 and 303 mounted in the spaces 200 and 300 are similar to the thermostat 103 and the thermostats 204 and 304 are similar to the thermostat 104.

For controlling the supply of heating medium to the radiator 101 is a valve 112 controlled by a valve motor 113. Motor 113 is provided with contacts 114 and 115 which are connected to the power supply. Contacts 116, 117, and 118 are provided for controlling the current through the motor. When contacts 116 and 117 are connected together the motor 113 is operated to cause valve 112 to close and when the contact 116 is connected to the contact 118 the motor 113 causes the valve 112 to open. Valves 212 and 312 located in the spaces 200 and 300 are controlled by motors 213 and 313, respectively, which motors are identical with the motor 113.

A relay generally designated by the reference character 120 is located in the space 100, said relay comprising a coil 121, an armature 122 and relay arms 123 and 124. Contacts 125 and 126 cooperate with the arm 123 and contact 127 cooperates with the arm 124. When the relay coil 121 is deenergized, as illustrated, arm 123 is in engagement with contact 126, and upon energization of coil 121, arms 123 and 124 are moved into engagement with contacts 125 and 127, respectively. Relays 220 and 320, identical to the relay 120, are provided in the spaces 200 and 300, respectively.

A second relay designated generally by the reference character 130 is provided in the space 100, said relay including a coil 131, an armature 132 and arms 133 and 134. Cooperating with the arm 133 is a contact 135 and contacts 136 and 137 cooperate with the arm 134. When the relay 130 is deenergized arm 134 is in engagement with the contact 137, as illustrated. Upon energization of coil 131 the arms 133 and 134 are moved into engagement with contacts 135 and 136, respectively. Relays 230 and 330 similar to the relay 130 are provided in the spaces 200 and 300, respectively.

For causing the energization of relay 130, is a normally open switch 140 which includes a switch arm 141 and contacts 142 and 143. Similar switches 240 and 340 are provided for controlling the relays 230 and 330, respectively. A second switch 145 comprising an arm 146 and contacts 147 and 148 is provided for causing the deenergization of relay 130. This switch is normally closed, as illustrated. Similar switches 245 and 345 are provided for causing the deenergization of relays 230 and 330.

*Operation*

Let it be assumed that it is daytime, time switch 25 is in its normally closed position and time switch 31 is in its normally open position. While the operation is described more particularly with relation to zone 100 in the following paragraphs it will be understood that the operation in zones 200 and 300 will be exactly the same.

Relays 120 and 130 are in their deenergized positions, as shown, and control over the radiator valve 113 is by the thermostat 103 which is set to maintain higher temperatures in the space than the thermostat 104. Power is supplied to the valve motor 113 through the following circuit: from one side of the secondary 24 through conductor 26, line 27, conductor 150, conductor 151, tap 114 and tap 115 through conductors 152, 168, line 33, and conductor 32 to the other side of the secondary 24. Since tap 116 of the valve motor 113 is connected to neither tap 117 nor 118, there is no circuit through the motor. Assume the temperature drops to a valve wherein the arm 109 engages contact 110. Tap 116 is then connected to tap 118 through the following circuit: from tap 116 through conductor 155, arm 123, contact 126, conductors 156, 157 through the bimetallic element 108 of thermostat 103, arm 109, contact 110, conductors 158, 159 to the terminal 118 of the valve motor 113. Valve motor 113 now operates to open the valve 112 thus permitting circulation of the heating medium through the radiator 101. The temperature of the space will now commence to rise and after it has risen to a predetermined value the arm 109 will engage contact 111. Terminals 116 and 117 of the valve motor 113 will now be connected through the following circuit: from terminal 116 through conductor 155, arm 123, contact 126, conductors 156 and 157, bimetallic element 108, arm 109, contact 111, conductors 161, 162 to the terminal 117 of the valve motor. The valve motor 113 now operates in the reverse direction to cause valve 112 to move to closed position and cut off the supply of the heating medium to the radiator 101. It will thus be seen that with the relays in their deenergized positions, as illustrated, that the valve motor 13 is under the control of the day thermostat 103.

At 4 p. m. the time switch 31 will close momentarily and energize the relay coil 121 through the following circuit: from the secondary 24 of transformer 22 through conductor 30, time switch 31, conductor 29, line 28, conductors 153, 166 through the relay coil 121, conductors 167, 150, line 27 and conductor 26 to the other side of secondary 24. Energization of coil 121 causes arms 123 and 124 to move into engagement with contacts 125 and 126, respectively. Movement of arm 124 into engagement with contact 126 closes a holding circuit through the coil 121 which circuit is independent of the time switch 31 and is as follows: from the secondary 24 through conductors 32, 168, 165, contact 127, arm 124, conductor 166 through the coil 121, conductors 167, 150, line 27 and conductor 26 to the other side of the secondary 24. It will thus be seen that the relay 120 will remain energized after the time switch 31 again opens.

The valve motor 113 is now under the control of the night thermostat 104 so that a lower temperature will be maintained in the space 100. It will of course be understood that the control of valve motors 213 and 313 in the spaces 200 and 300 will be similarly transferred to the night thermostats 204 and 304. When the temperature in the space 100 drops to a value low enough to cause the arm 105 to move into engagement with the contact 106, the terminals 116 and 118 of the valve motor 113 will be connected together through the following circuit: from terminal 116 through conductor 155, arm 123, contact 125, conductor 170, arm 134, contact 137, conductor 171, bimetallic element 104, arm 105, contact 106 and conductors 172 and 159 to the terminal 118. By reason of the connection of these two terminals the valve motor 113 will operate to open the valve 112 and admit the heating medium to the radiator 101. When the temperature in the space 100 has risen to a value high enough to cause the arm 105 to engage the contact 107 the terminals 116 and 117 of the valve motor 113 will be connected through the following circuit: from terminal 116 through conductor 155, arm 123, contact 125, conductor 170, arm 134, contact 137, conductor 171, bimetallic element 104, arm 105, contact 107, conductors 175 and 162 to the terminal 117. The valve motor 113 will now be operated in the reverse direction to cause valve 112 to move to closed position.

As long as relay 120 remains energized and relay 130 remains deenergized, the thermostat 104 will control the valve motor 113 and cause a lower temperature to be maintained in the space 100 than is maintained when the valve motor 113 is under the control of the thermostat 103. Relay 120 will remain in its energized position as long as the holding circuit through the arm 124 is maintained and this holding circuit can be interrupted only by cutting off the source of power. This will occur at 11 p. m. by the time switch 25 but since the time switch 31 is momentarily closed at 11:05 p. m., the relay 120 again becomes energized. The reason for switch 25 opening at 11 p. m. and switch 31 closing at 11:05 p. m. will be subsequently explained. At 7 a. m. the switch 25 again opens momentarily which interrupts the holding circuit through the arms 124 thus causing relay 120 to become deenergized whereupon the valve motor 113 is again under the control of the day thermostat 103. It will of course be understood that the switches 25 and 31 affect the relays 220 and 320 in exactly the same manner as they do the coil 120 so that these zones are simultaneously placed under the control of the day thermostats or the night thermostats.

Assume now that the time switch 31 has operated so that the valve motors are all under the control of the night thermostats, the time being subsequent to 4 p. m. If it is desired to occupy one of the rooms such as the room 100 it will be desirable to maintain a higher temperature in this room than would be maintained by the night thermostat. In order to place the motor 113 again under the control of the day thermostat 103 it is merely necessary to momentarily move the switch arm 141 into engagement with the contacts 142 and 143, respectively, causing a circuit to be established through the relay coil 131 which is as follows: from one side of the secondary 24 through conductors 32, line 33, conductor 180, contact 143, the switch arm 141, contact 142, conductors 181, 182 through the coil 131, conductor 183, line 27, and conductor 26 to the other side of the secondary 24. A holding circuit is also established through the coil 131 which is independent of the switch 140, this circuit being as follows: from the secondary 24 through conductor 32, line 33, conductor 180, contact 147, switch blade 146, contact 148, conductor 185, contact 135, arm 133 which has moved into engagement with contact 135 upon the energization of coil 131, conductor 182 through the coil 131, conductor 183, line 27, and conductor 26 to the other side of secondary 24. Energization of coil 131 causes the arm 134 to move into engagement with contact 136 so that the valve 113 is again under the control of the thermostat 103 as explained below.

Upon a call for heat by thermostat 103, arm 109 will move into engagement with contact 110 and closing a circuit between terminals 116 and 118 of motor 113, which circuit is as follows, it being remembered that both relays 120 and 130 are now energized: from the terminal 116 through conductor 155, arm 123, contact 125, conductor 170, arm 134, contact 136, conductors 186, 157, bimetallic element 108, arm 109, contact 110, conductors 158 and 159 to the terminal 118. The valve 112 is now moved into open position whereupon the heating medium is supplied to the radiator 101. When the thermostat 103 becomes satisfied, arm 109 will engage contact 111 and connect terminals 116 and 117 through the following circuit: from terminal 116 through conductor 155, arm 123, contact 125, conductor 170, arm 134, contact 136, conductors 186 and 157, bimetallic element 103, arm 109, contact 111, conductors 161 and 162 to the terminal 117. Thus as long as both relays 120 and 130 are energized the valve motor 113 is under the control of the day thermostat 103. It will thus be seen that during the night-time when the valve motors are normally under the control of the night thermostats, that the valve motor in any one or more zones may be placed under the control of the day thermostat by operation of switches 140, 240, or 340.

Since energization of the relay coil 131 is through the holding circuit which includes the switch 145, opening of this switch will cause the relay 130 to become deenergized and if the relay 120 is still energized the valve motor 113 will again be under the control of the night thermostat 102. In the normal operation of the system, it is intended that the occupant of any one of the zones during the night should operate the switch 145 in zone 100, or the corresponding switches in the other zones, when the room is vacated for the night so that the night thermostat will again resume control over that particular zone. Should the occupant fail to operate the switch however, the night thermostat will automatically resume control over the valve motor at a predetermined time which has been chosen as 11 p. m. Thus, at 11 p. m. time switch 25 is momentarily opened which interrupts the supply of power to transformer 22 and breaks the holding circuits through both relays 120 and 130. At 11:05 p. m. the time switch 31 momentarily closes which again energizes the relay coil 120 through the circuit previously described. Since energization of relay coil 131 is dependent upon the manual operation of switch 140 it will be apparent that this operation of the time switches 25 and 31, in the order specified, will cause both relay coils to be deenergized and relay 120 to again become energized thus placing the valve motor 113 under the control of thermostat 102.

Should the occupant of the zone during the night desire to remain after 11 p. m. at which time the night thermostat automatically resumes control over the system a second manipulation of switch 140 will again place the valve motor 113 under the control of the day thermostat as previously described. Upon leaving the zone the occupant should manipulate the switch 145 thus placing the valve motor again under the control of the night thermostat 104. Should he fail to do this, no harm will result and the system will resume normal operation the following day.

Assuming now that the valve motor 113 is under the control of the night thermostat 102, relay 120 being energized and relay 130 being deenergized, the valve motor will be automatically placed under the control of the day thermostat at 7 a. m. at which time the switch 25 momentarily opens, interrupting the supply of power to the transformer 22, thus breaking the holding circuit through the relay 120.

If for any reason during the day switch 140 is operated to close the contacts 142 and 143 as is likely to happen, particularly in a school room, the relay 130 will become energized but this will not have any effect upon the control of thermostat 103 over the valve motor 113. If this relay 130 should remain energized throughout the day it should be deenergized before the night shut-down since otherwise when relay 120 becomes energized the thermostat 103 would still exercise control over the valve motor. For this reason the time switch 25 momentarily breaks the circuit through the line 20, thus causing deenergization of relay 130 by interrupting the holding circuit as previously described, so that when at 4 o'clock the time switch 31 momentarily closes, the relay 120 will become energized and since relay 130 has just previously been deenergized the night thermostat 102 will exercise control over the valve motor 113. It is therefore seen that the day operation of the system will not be in any way affected by tampering of the switches 140, 240, or 340 and that the system will automatically go on its proper night operation regardless of what may have been done to the switches during the day-time.

Having described the preferred embodiment of my invention it should be understood that this is for purposes of illustration only and that my invention is to be limited only by the scope of the appended claims.

I claim as my invention:

1. In a system of the class described, a pair of thermostats, a temperature changing device selectively under the control of each of said thermostats, one of said thermostats when in control of said temperature changing device acting to maintain one temperature in a space being controlled, the other thermostat when in control of said temperature changing device acting to maintain a different temperature in the space being controlled, a pair of relays, time controlled means periodically causing the energization and deenergization of one of said relays, manual means controlling the energization of said other relay, means whereby the first thermostat is in control of the temperature changing device when neither relay is energized, means whereby the second thermostat is in control of the temperature changing device when said one relay is energized, and means whereby the first thermostat is in control of the temperature changing device when both relays are energized, said time controlled means including means for automatically deenergizing both of said relays at a predetermined time during the period that said relay is normally energized and for shortly thereafter causing the energization of said one relay only whereby said second thermostat is again placed in control of the temperature changing device regardless of the previous operation of said manual means.

2. In a temperature control system, temperature responsive means, temperature changing means under the control of the temperature responsive means, means controlling the temperature responsive means whereby different temperatures are automatically maintained in the space being controlled during the day and night, manual means for causing the temperature responsive means to maintain the day temperature during the night, second manual means for causing the system to revert to normal operation during the night after operation of the first manual means, and means operative during the night for automatically causing the system to revert to normal night operation at a predetermined time after the beginning of night operation.

3. In a zone temperature control system, a plurality of zones whose temperature is to be controlled, temperature control means for each zone, means for automatically operating said temperature control means whereby one predetermined temperature is maintained in said zones during one portion of a day and whereby a second predetermined temperature is maintained in the zones during a second portion of the day, manual means in each zone for causing operation of the temperature control means to maintain in that zone the temperature during said one portion of the day normally maintained during the other portion of the day, and a single means for automatically operating at a predetermined hour during said one portion of the day each of the temperature control means which were manually caused to maintain a different temperature to again maintain in all the zones the temperature normally maintained during said portion of the day.

4. In a temperature control system, a space whose temperature is to be controlled, temperature control means for said space, means for automatically operating said temperature control means whereby one predetermined temperature is maintained in said space during one portion of the day and whereby a second predetermined temperature is maintained in said space during a second portion of the day, manually operated means for causing operation of the temperature control means to maintain in the space the temperature during said one portion of the day normally maintained during the other portion of the day, and means for automatically operating the temperature control means at a predetermined time after the beginning of said one portion of the day to again maintain in said space the temperature normally maintained during said portion of the day.

5. In a system of the class described, condition changing means for a space, a pair of condition responsive devices responsive to a condition being controlled in the space in control of said condition changing means, said condition responsive devices arranged to be selectively placed in control of the condition changing means to maintain selectively different conditions in the space, first and second relay means, circuit connections for placing one of said condition responsive means in control of the condition changing means when neither of the relay means nor both of the relay means are energized, means for placing the other of said condition responsive means in control of the condition changing means when the first only of said relay means is energized, normally open switch means, circuit connections operative upon momentary closure thereof to energize and maintain energized said second relay means, first timing means operative to periodically cause the energization of said first relay means, and second timing means operative to periodically cause the deenergization of both of said relay means.

6. In a system of the class described, temperature changing means for a space, space temperature responsive means in control of the temperature changing means and arranged to control the temperature changing means to maintain one of two predetermined temperatures within the space, first and second relay means, means for causing the temperature responsive means to control the temperature changing means when both relay means are energized or when both relay means are deenergized to maintain one predetermined temperature in the space, means for causing the temperature responsive means to control the temperature changing means to maintain a second predetermined temperature in the space when the first only of said relay means is energized, normally open switch means, circuit connections operative upon momentary closure thereof to energize and maintain energized said second relay means, first timing means operative to periodically cause the energization of said first relay means, and second timing means operative to periodically cause the deenergization of both of said relay means.

7. In a zone temperature control system, a plurality of zones whose temperature is to be controlled, temperature control means for each zone adapted to maintain the zone temperature selectively at either of two values, means in each zone for selecting the temperature value to be maintained therein, clock means for simultaneously operating all said selecting means, manual means in each zone effective only after said clock means has selected the lower of said two values to operate said selecting means, whereby the temperature level in any zone may be selected by a person therein, said clock means operating in the morning to select the higher of said two values for all zones, in the evening to select the lower of said two values for all zones, and at a predetermined time after said evening operation to select said high value, thereby rendering said manual means ineffective, and immediately thereafter to select said low value for all zones.

8. In a zone temperature control system, a plurality of zones whose temperature is to be controlled, temperature control means for each zone adapted to maintain the zone temperature selectively at either of two values, means in each zone for selecting the temperature value to be maintained therein, manual means in each zone for operating said selecting means, and clock means for operating all said selecting means simultaneously at predetermined intervals, said clock means being effective when operating said selecting means in one sense to render all said manual means ineffective, and effective when operating said selecting means in the opposite sense to maintain each zone at the temperature value selected by said manual means.

9. In a condition controlling system, a pair of condition responives devices, condition changing means under the control of said condition responsive devices, a pair of control means, time controlled means for periodically causing the energization and deenergization of one of said control means, manual means for controlling the energization of said other control means, means whereby one of the condition responsive means controls the condition changing means when neither of said control means is energized, means whereby the other condition responsive means controls the condition changing means when said one of said control means is energized, and means whereby said one condition responsive means controls the condition changing means when both of said control means are energized, said time controlled means including means for automatically deenergizing both of said control means at a predetermined time during the period that said one control means is normally energized and for shortly thereafter causing the energization of said one control means only whereby said other condition responsive means is again placed in control of the condition changing means regardless of the previous operation of said manual means.

ANDREW B. SIMON, Jr.